United States Patent [19]

Hauk et al.

[11] Patent Number: 5,238,487
[45] Date of Patent: Aug. 24, 1993

[54] PROCESS FOR THE PRODUCTION OF PIG IRON AND SPONGE IRON

[75] Inventors: Rolf Hauk, Hochern; Werner Kepplinger, Leonolip; both of Fed. Rep. of Germany

[73] Assignee: Deutsche Voest Alpine Industrieanlagenbau GmbH, Dusseldorf, Fed. Rep. of Germany

[21] Appl. No.: 799,415

[22] Filed: Nov. 27, 1991

[30] Foreign Application Priority Data

Nov. 29, 1990 [DE] Fed. Rep. of Germany ....... 4037977

[51] Int. Cl.[5] .............................................. C21B 13/14
[52] U.S. Cl. ..................................................... 75/492
[58] Field of Search ................... 75/492, 446, 10.22, 75/10.38, 958

[56] References Cited

U.S. PATENT DOCUMENTS 4,857,105 8/1989 Hauk et al. ........................... 75/492
5,043,011 8/1991 Hauk ................................. 75/10.22

Primary Examiner—Melvyn J. Andrews
Attorney, Agent, or Firm—Locke Reynolds

[57] ABSTRACT

A process for producing pig iron is described, which contains a reducing shaft furnace 1 and a melting gasifier 2. The sponge iron produced from iron ores in the reducing shaft furnace is supplied to the melting gasifier and converted there into a pig iron melt. The gas produced in the melting gasifier is supplied directly via a line 4 as reducing gas to the reducing shaft furnace. The blast furnace gas passing out of the reducing shaft furnace, after traversing a $CO_2$ scrubber 6, is at least partly heated in a heat exchanger to 200° to 500° C. and passed to a partial combustion plant 13 where, accompanied by the addition of oxygen, the gas is heated to the necessary reducing temperature.

6 Claims, 4 Drawing Sheets

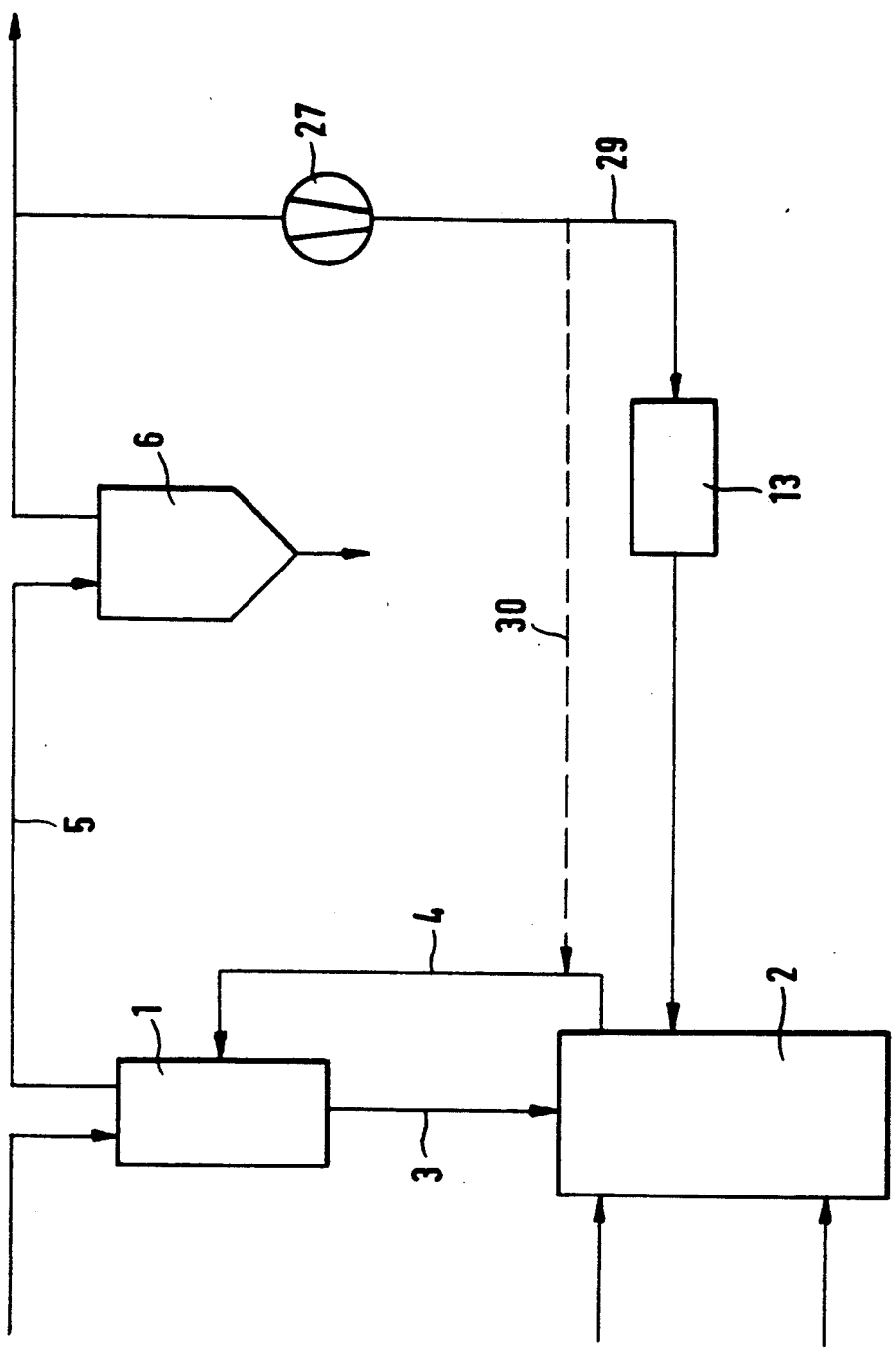

PROCESS FOR THE PRODUCTION OF PIG IRON AND SPONGE IRON

BACKGROUND OF THE INVENTION

The invention relates to a process for producing pig iron, in which the iron ore is reduced in a reducing shaft furnace and the resulting sponge iron is subsequently melted in a melting gasifier into which are introduced a carbon carrier and an oxidizing gas and the gas produced in the melting gasifier is passed in the form of a reducing gas into the reducing shaft furnace.

German Patent 28 43 303 discloses a process for producing molten pig iron and reducing gas in a melting gasifier, in which the sponge iron particles are melted to molten pig iron or steel raw material and the heat and reducing gas necessary for melting are produced by the coal supplied and oxygen-containing gas blown in above the melt. In this process a relatively large amount of surplus or export gas is obtained and the energy consumption, i.e. the consumption of coal and oxygen is very high. If the export gas cannot be economically used, the pig iron production costs are very high. The chemical energy in the export gas is more than 50% of the energy supplied with the coal and the utilization of the reducing gas produced in the melting gasifier is max. 44%.

It is known from U.S. Pat. No. 4,225,340 to substantially free from carbon dioxide the top gas of a reducing shaft furnace and to use the thus prepared top gas for producing fresh reducing gas. It is supplied to the starting gas of a fossil fuel-processing gasifier, a gas reactor connected behind the latter and also the starting gas of the gas reactor either directly or via a gas heater. The starting gas of the gas reactor with the admixed, prepared top gas is supplied as reducing gas to the reducing shaft furnace. However, this known process is only used for producing sponge iron without using a melting gasifier.

A similar sponge iron production process is known from U.S. Pat. No. 4,260,412, in which top gas of a reducing shaft furnace prepared by carbon dioxide removal is used for producing fresh reducing gas.

The gas producer is a fluidized bed gasifier, to which are supplied the prepared top gas, coal and lime, as well as oxygen and optionally water vapour.

With the starting gas of said gasifier is admixed the prepared top gas both directly and via a gas heater, before it is passed into the reducing shaft furnace. This process also operates without a melting gasifier for the production of pig iron.

German Patent 34 38 487 discloses a process for producing pig iron, in which the top gas of the reducing shaft furnace is at least partly freed from the oxidizing constituents ($CO_2$ and $H_2O$) and the thus prepared top gas is supplied to the melting gasifier. However, no economically satisfactory solution is found for the utilization of the energy rich top gas.

A complete gas recycling following the purification stage into the melting gasifier is only possible with coals having a volatile constituent content below 25% (waf). The heating of the top gas after purification by means of heat exchangers is subject to limits, which are prejudicial to an effective utilization.

SUMMARY OF THE INVENTION

Therefore the problem of the present invention is to give a process of the aforementioned type, in which a considerable temperature increase of the top gas without CO decomposition is sought for the additional production of sponge iron.

According to the invention this problem is solved in that the preheated top gas from which the oxidizing constituents have been removed is brought to a reducing temperature of 750° to 850° C. by a partial combustion and accompanied by the addition of oxygen.

According to an advantageous development of this process, prior to introduction into the heat exchanger, to the purified top gas are added inhibitors, which as $SO_2$, $H_2S$, $NH_3$, $(CN)_2$, $NO_2$ or $CL_2$ are used singly or in combination. In addition, cooled gasifier gas can be added to the purified top gas prior to entering the heat exchanger. In a special development of the invention the partial combustion is performed in a fluid or fluidized bed reactor, which is operated on the basis of regenerative ceramic particles heated by partial gas combustion processes. The partial gas used is obtained during $CO_2$ scrubbing. In addition, it is possible to carry out the partial combustion by using plasma burners or electric resistance heating and switchable, indirect heat exchangers. According to a special development of the invention, the preheated top gas from which the oxidizing constituents have been removed is passed at least partly via the melting gasifier (2) into a further reducing shaft furnace (15).

BRIEF DESCRIPTION OF THE DRAWINGS

Embodiments of the invention are described hereinafter relative to the drawings, wherein show:

FIG. 4 another embodiment.

DESCRIPTION OF THE PREFERRED EMBODIMENT

The plant contains a reducing shaft furnace 1 constructed in the known manner and to which is supplied from above by means of a not shown inlet iron ore and fluxes.

Below the reducing shaft furnace 1 is positioned the melting gasifier 2 which, by means of the line 3, receives the sponge iron produced by reducing the iron ore and from it is formed a pig iron melt. For this purpose coal and oxygen are supplied to the melting gasifier 2. Reducing gas is passed by means of a line 4 from the melting gasifier 2 to the reducing shaft furnace 1.

Figure 1:
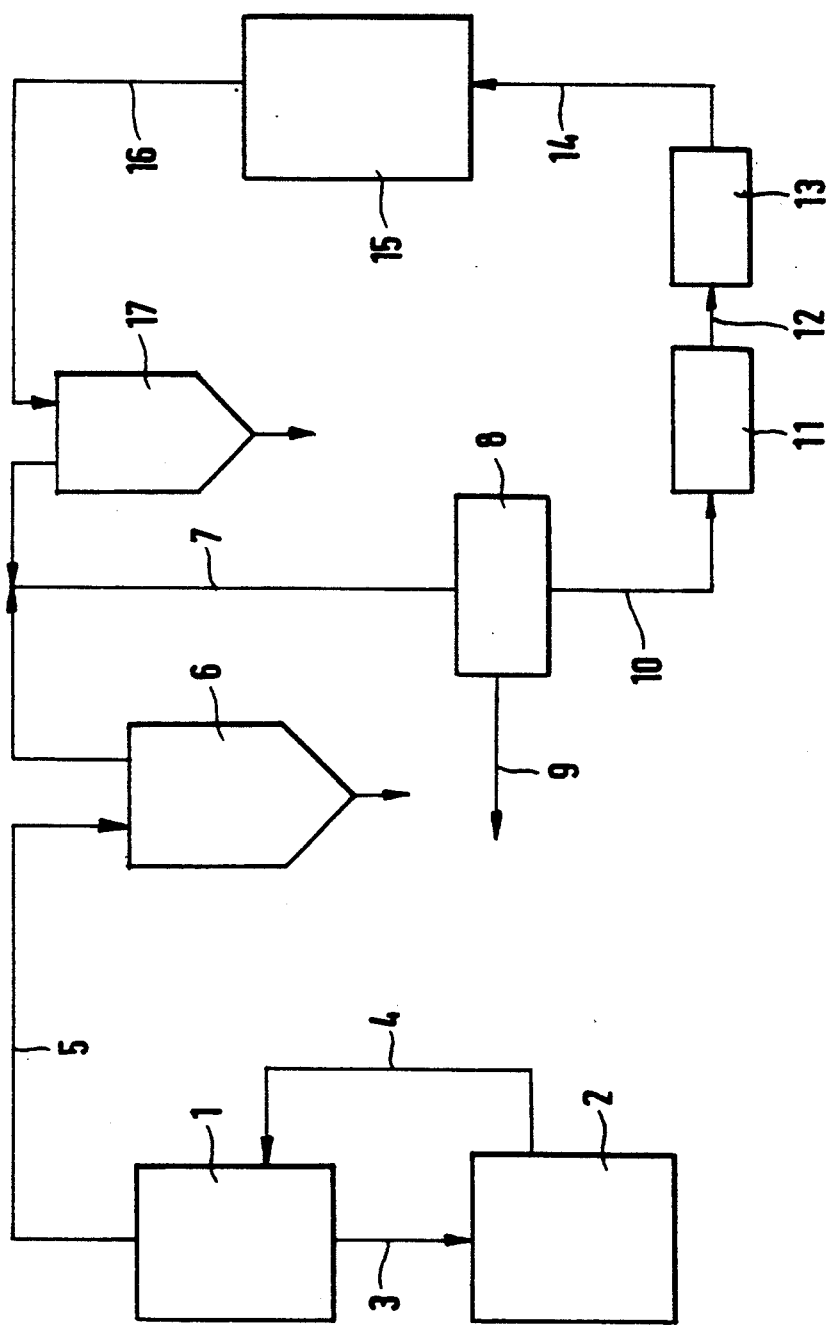
FIG. 1 the diagrammatic representation of a plant for producing pig iron with top gas heating in a partial combustion plant and following reducing shaft furnace.

The top gas of the reducing shaft furnace 1 is supplied by means of the line 5 to the scrubber 6, where dust and steam are removed therefrom (FIG. 1). By means of the line 7 the gas passes into the $CO_2$ scrubber 8, which can be constructed as a pressure swing absorption (PSA) plant. From there the $CO_2$-rich residual gas is removed via line 9 for further use and the reducing gas is fed via line 10 to heat exchanger 11 for heating purposes. The gas passes from the heat exchanger 11 via line 12 into the partial combustion plant 13, from where it is brought from below via line 14 into the reducing shaft furnace 15.

After passing out of the reducing shaft furnace 15 the gas is passed through line 16 via a further scrubber 17 or directly to the $CO_2$ scrubber 8.

The gas leaving the $CO_2$ scrubber 8 via line 10 has a residual $CO_2$ content of 2% and a temperature of 30° to 60° C. It is not possible to heat this gas to the reducing temperature in one stage via the heat exchanger 11, because the CO-decomposition range is traversed and has a maximum at approximately 550° to 600° C. Thus, the top gas is only heated in the heat exchanger 11 to a temperature of approximately 200° to 500° C. The further heating to the reducing temperature is brought about by the partial combustion plant 13 by means of oxygen fed into the gas flow.

In the embodiment in the case of a recycled gas quantity of 60,000 $Nm^3/h$ and a preheating in the heat exchanger 11 to 400° C., it is necessary to have a partial combustion with approximately 1700 $Nm^3$ of oxygen in order to obtain a reducing temperature of 850° C. This partly reduces the value of the reducing gas and the $CO_2$ and $H_2O$ content rises from 2% to approximately 7.7%. Due to the low reducing potential of the gas, it is necessary to increase the reducing gas quantity supplied to the reducing shaft furnace 15, said quantity increasing as the preheating temperature attainable in the heat exchanger 11 drops. Thus, e.g. the necessary reducing gas quantity per ton of ore on reducing the preheating temperature from 500° to 400° C. rises by 80 $Nm^3/t$ of ore (from 1340 to 1260 $Nm^3/t$ of ore).

In order to increase the preheating temperature in the heat exchanger 11 to temperatures above 500° C. and therefore reduce the partial combustion by oxygen, prior to entering the heat exchanger 11 with the gas are admixed inhibitors, whilst simultaneously suppressing CO-decomposition. The inhibitors are e.g. constituted by $SO_2$, $H_2S$, $NH_3$, $(CN)_2$, $NO_2$ or $CL_2$. This makes it possible to improve the reducing gas quality and increase sponge iron production. It is possible in this connection to admix cooled gasifier gas with the gas prior to entering the heat exchanger 11. This gas contains approximately 500 ppm of $H_2S$, so that here again CO-decomposition is suppressed.

It is also possible to carry out partial combustion or heating by means of plasma burners or electric resistance heating.

Figure 2:
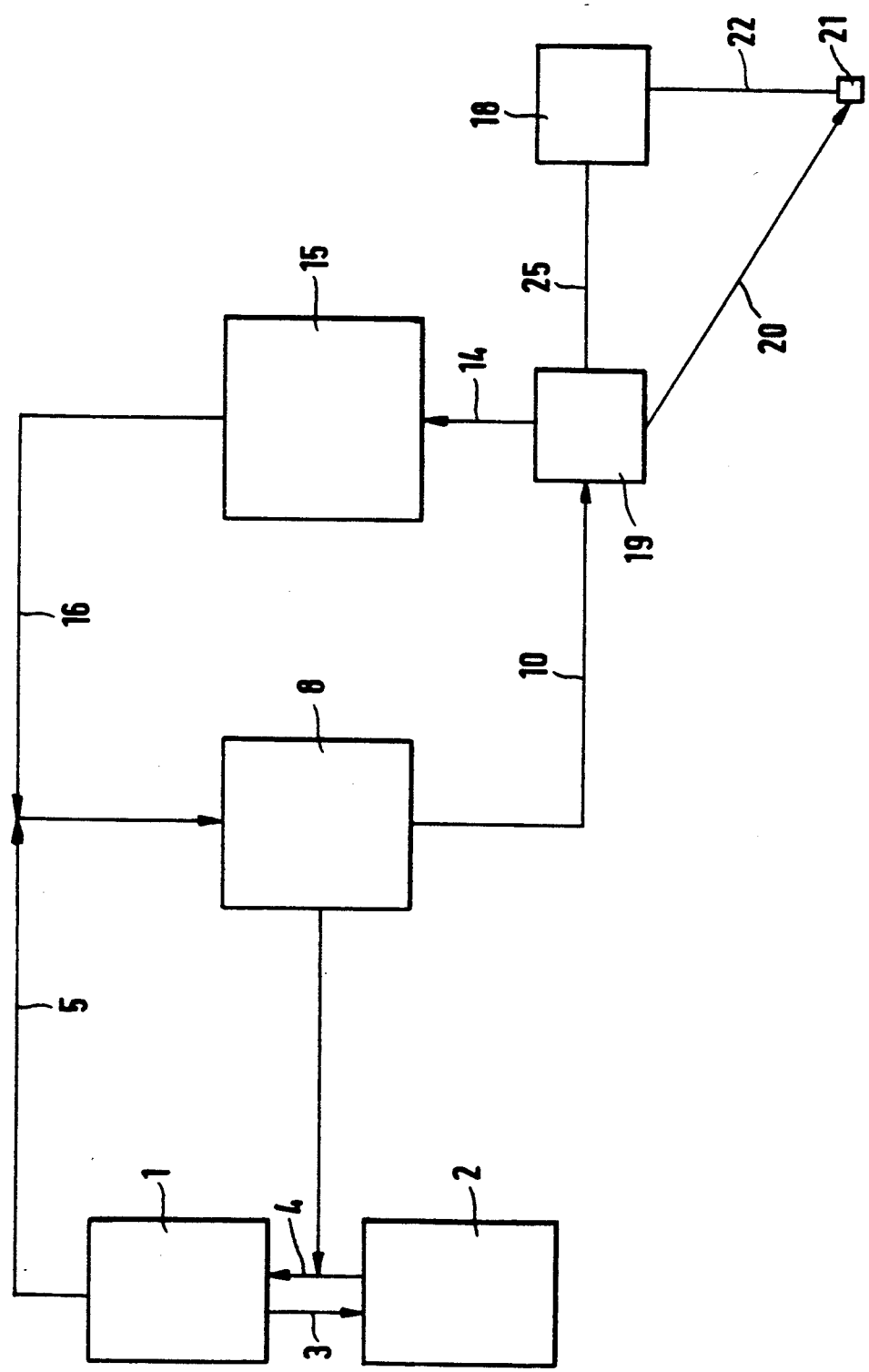
FIG. 2 the diagrammatic representation of a plant for producing pig iron with a fluidized bed reactor as the partial combustion plant.

The partial combustion can also be performed in a fluid or fluidized bed reactor, the latter being operated on the basis of regenerative ceramic particles heated by partial gas combustion, as can be more clearly seen from FIG. 2. The partial gas can come from the $CO_2$ scrubber 8 or preferably from the pressure swing absorption plant.

In the separately provided, raised regenerator 18 the ceramic particles are heated to approximately 900° C. and separated carbon is also burnt. The thus heated ceramic particles are conveyed via the line 25 into the heat exchanger 19 and yield their heat to the gas flowing via the line 10 into the heat exchanger 19. The thus heated gas flows via the line 14 into the reducing shaft 15. The cooled ceramic particles pass via the line 20 to a conveying station 21 and are conveyed from there via line 22 accompanied by the adding of a conveying medium, to the regenerator 18, where they are again heated.

A preheating of the gas in the fluidized bed reactor 19 to 750° to 800° C. is adequate, because no aggregates to be calcined are added to the reducing shaft furnace 15. It is advantageous that for this purpose it is possible to use lean gas, e.g. residual gas and there is scarcely any deterioration to the gas quality during heating. In place of the partial combustion plant 13, it is easily possible to heat the top gas by means of plasma burners, electric resistance heating or switchable indirect heat exchangers.

Figure 3:
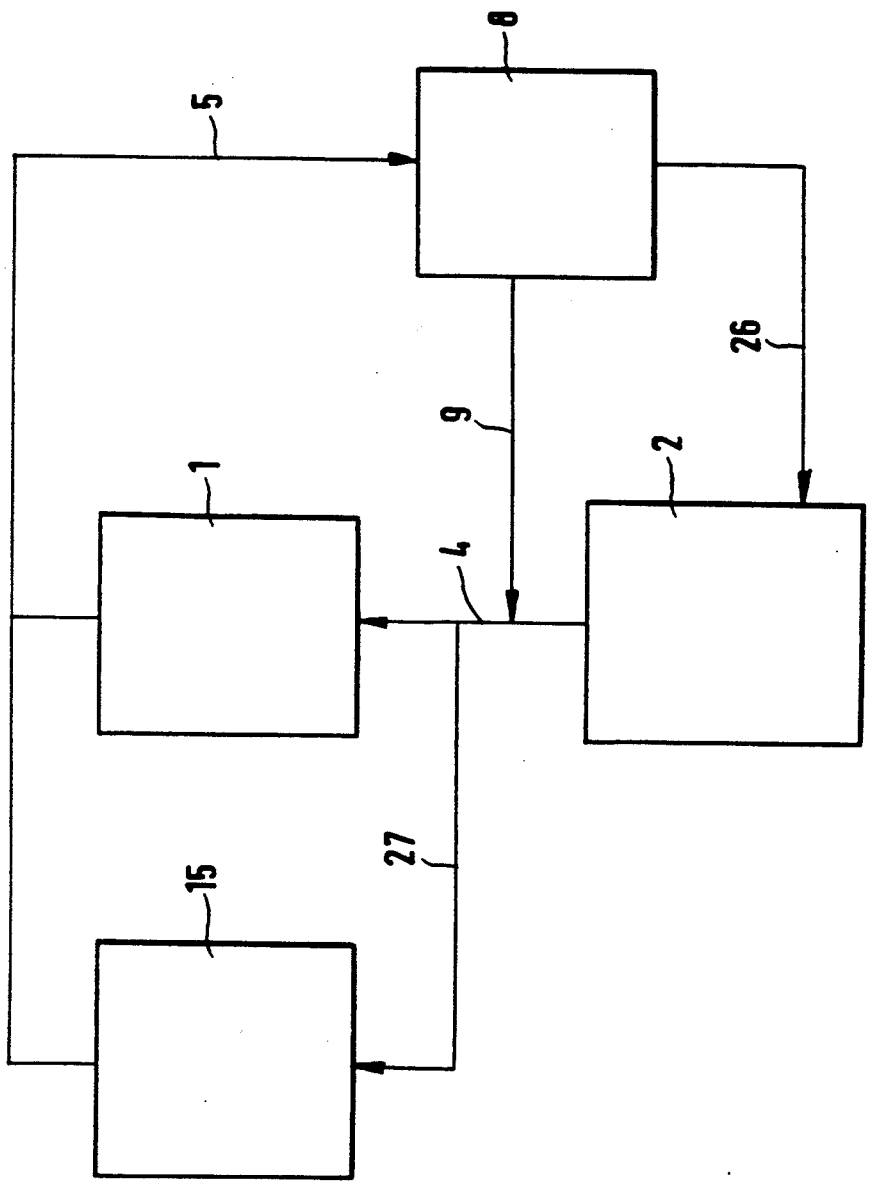
FIG. 3 a representation with blast furnace gas heating in the melting gasifier.

In a further embodiment of the invention the $CO_2$ scrubber 8 is on the one hand connected via the line 26 to the melting gasifier 2 and on the other hand via the line 9 to the line 4 between the melting gasifier 2 and the reducing shaft furnace 1 (FIG. 3).

The second reducing shaft furnace 15 is supplied with preheated reducing gas from the melting gasifier 2 by means of a line 27. The top gas produced there passes with the top gas of the reducing shaft furnace 1 via the line 5 into the $CO_2$ scrubber 8. A partial combustion is not necessary, because the purified top gas has partly been heated in the melting gasifier 2 to the temperature of approximately 800° to 850° C. necessary for the additional reducing shaft furnace 15. This would lead to a reduction of the plant scope, but most would be used for cooling the gasifier gas at approximately 1050° C.

It can finally also be advantageous to heat the recycled $CO_2$-free reducing gas to 200° to 500° C. in a heat exchanger, in order to subsequently blow it together with the oxygen into the melting gasifier. By partial combustion this leads to a temperature rise to the temperature level in the gasifier. The total gas quantity can be so increased in this way that both reducing shaft furnaces can be supplied with the necessary reducing gas.

Another variant of top gas recycling is shown in FIG. 4, where there is no $CO_2$ removal. The top gas is supplied via the line 5 from the reducing shaft furnace 1 to a dust scrubber 6, from which part is removed as export gas and another is recycled as recycling gas via a compressor 27 into the melting gasifier 2, accompanied by the interposing of a heating means 13. It can also be advantageous, instead of feeding the recycled gas via the line 29 into the melting gasifier 2, to mix it directly via line 30 into the reducing shaft furnace 1 and therefore cools the hot gasifier gas to the reducing temperature.

Finally, in all embodiments of the invention, the reducing gas passing through gas line 4 from the melting gasifier into the reducing shaft furnace can be desulphurized.

We claim:

1. A process for producing iron from iron-containing raw materials, the process comprising the steps of
reducing the iron-containing raw materials to sponge iron in a first reducing shaft furnace, the first reducing shaft furnace operating with reducing gas obtained from a melting gasifier positioned to receive sponge iron from the first reducing shaft furnace, with the reducing shaft furnace operating to produce a supply of top gas containing oxidizing constituents,
melting sponge iron supplied by the first reducing shaft furnace and received by the melting gasifier using a solid carbon carrier and oxygen containing gas introduced into the melting gasifier,
removing oxidizing constituents from the top gas,
heating the top gas from which oxidizing constituents have been removed to a temperature
between about 750 degrees Celsius to about 850 degrees Celsius to form a heated gas, and supplying the heated top gas to a second reducing shaft furnace.

2. The process according to claim 1, further comprising the step of inhibiting decomposition of carbon monoxide in the top gas, the inhibiting step occurring prior to the step of supplying the heated top gas to the second reducing shaft furnace.

3. The process according to claim 2, wherein the inhibiting step further comprises the step of adding at least one of sulfur dioxide, hydrogen sulfide, ammonia, cyanide, nitrogen oxides, and chlorine to inhibit carbon monoxide decomposition.

4. The process according to claim 1, wherein the heating step further comprises the step of passing the top gas through a fluidized bed reactor.

5. The process according to claim 4, further comprising the step of regenerating the fluidized bed using ceramic particles heated by partial gas combustion.

6. The process according to claim 1, further comprising the the steps of heating in a heat exchanger the top gas to a temperature between about 200 degrees Celsius and 500 degrees Celsius, adding oxygen to the top gas heated in the heat exchanger to promote partial combustion of the top gas, raising the temperature of the top gas to between about 750 degrees Celsius to about 850 degrees Celsius.

* * * * *